(12) United States Patent
Chen et al.

(10) Patent No.: US 12,049,042 B2
(45) Date of Patent: Jul. 30, 2024

(54) POWDER SPREADER

(71) Applicant: Wisconsin Alumni Research Foundation, Madison, WI (US)

(72) Inventors: Lianyi Chen, Madison, WI (US); Luis Izet Escano, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/694,378

(22) Filed: Mar. 14, 2022

(65) Prior Publication Data

US 2023/0286212 A1 Sep. 14, 2023

(51) Int. Cl.
*B29C 64/218* (2017.01)
*B29C 64/153* (2017.01)
*B33Y 10/00* (2015.01)
*B33Y 30/00* (2015.01)

(52) U.S. Cl.
CPC .......... *B29C 64/218* (2017.08); *B29C 64/153* (2017.08); *B33Y 10/00* (2014.12); *B33Y 30/00* (2014.12)

(58) Field of Classification Search
CPC ..... B29C 64/218; B29C 64/153; B33Y 10/00; B33Y 30/00
See application file for complete search history.

(56) References Cited

U.S. PATENT DOCUMENTS 6,213,168 B1 * 4/2001 Gaylo ............... B29C 41/12
    141/73
8,568,124 B2  10/2013 Brunermer
10,399,183 B2  9/2019 Dallarosa et al.

OTHER PUBLICATIONS

Sames, W. J., List, F. A., Pannala, S., Dehoff, R. R. & Babu, S. S. The metallurgy and processing science of metal additive manufacturing. Int. Mater. Rev. 61, 315-360 (2016).
Cima, M. & Cornie, J. Three-Dimensional Printing: Rapid Tooling and Prototypes Directly from a CAD Model. Int. Solid Free Form Fabr. Symp. Austin, TX. 201-204 (1990).
Kruth, J., Levy, G., Klocke, F. & Childs, T. H. C. Consolidation phenomena in laser and powder-bed based layered manufacturing. CIRP Ann. 56, 730-759 (2007).
Gu, D. D., Meiners, W., Wissenbach, K. & Poprawe, R. Laser additive manufacturing of metallic components: materials, processes and mechanisms. Int. Mater. Rev. 57, 133-164 (2012).
Gürtler, F. j. et al. Influence of powder distribution on process stability in laser beam melting: Analysis of melt pool dynamics by numerical simulations. Int. Solid Free Form Fabr. Symp. Austin, TX. 1099-1117 (2014).
Lee, Y. S. & Zhang, W. Mesoscopic simulation of heat transfer and fluid flow in laser powder bed additive manufacturing. Int. Solid Free Form Fabr. Symp. Austin, TX. 1154-1165 (2015).

(Continued)

*Primary Examiner* — Galen H Hauth
*Assistant Examiner* — John Robitaille
(74) *Attorney, Agent, or Firm* — Crawford Maunu PLLC

(57) ABSTRACT

Aspects of the disclosure are directed to powder spreading and an apparatus therefor. As may be implemented in accordance with one or more embodiments, an apparatus having a flexible core and a shell on a surface of the core is used to displace powder in a powder bed. The shell has a low coefficient of friction, for example on the order of 0.10, and may operate to conduct static electricity away from the powder. The shell may be engaged with the powder to displace the powder and form a uniform powder layer having a planer upper surface, as the core is advanced across the powder bed.

13 Claims, 10 Drawing Sheets

(56) References Cited

OTHER PUBLICATIONS

Ziegelmeier, S. et al. An experimental study into the effects of bulk and flow behaviour of laser sintering polymer powders on resulting part properties. J. Mater. Process. Technol. 215, 239-250 (2015).

Zielinski, J., Vervoort, S., Mindt, H.-W. & Megahed, M. Influence of powder bed characteristics on material quality in additive manufacturing. BHM Berg- und Huttenmannische Monatshefte 162, 192-198 (2017).

Nalluri, V. R. & Kuentz, M. Flowability characterisation of drug-excipient blends using a novel powder avalanching method. Eur. J. Pharm. Biopharm. 74, 388-396 (2010).

Spierings, A. B., Voegtlin, M., Bauer, T. & Wegener, K. Powder flowability characterisation methodology for powder-ped-based metal additive manufacturing. Prog. Addit. Manuf. 1, 9-20 (2016).

Johanson, K. Effect of particle shape on unconfined yield strength. Powder Technol. 194, 246-251 (2009).

Nan, W., Ghadiri, M. & Wang, Y. Analysis of powder rheometry of FT4: Effect of particle shape. Chem. Eng. Sci. 173, 374-383 (2017).

Shanjani, Y. & Toyserkani, E. Material spreading and compaction in powder-based solid freeform fabrication methods: mathematical modeling. Int. Solid Free. Fabr. Symp. Austin, TX. 399-410 (2008).

Johanson, J. R. A rolling theory for granular solids. J. Appl. Mech. 32, 842-848 (1965).

Herbold, E. B., Walton, O. & Homel, M. A. Simulation of powder layer deposition in additive manufacturing processes using the discrete element method. technical report, Lawrence Livermore National Laboratory. (2015).

Parteli, E. J. R. & Poschel, T. Particle-based simulation of powder application in additive manufacturing. Powder Technol. 288, 96-102 (2016).

Haeri, S., Wang, Y., Ghita, O. & Sun, J. Discrete element simulation and experimental study of powder spreading process in additive manufacturing. Powder Technol. 306, 45-54 (2016).

Chen, H., Wei, Q., Wen, S., Li, Z. & Shi, Y. Flow behavior of powder particles in layering process of selective laser melting: Numerical modeling and experimental verification based on discrete element method. Int. J. Mach. Tools Manuf. 123, 146-159 (2017).

Haeri, S. Optimisation of blade type spreaders for powder bed preparation in additive manufacturing using DEM simulations. Powder Technol. 321, 94-104 (2017).

Zhang, W., Mehta, A., Desai, P. S. & Higgs, C. F. Machine learning enabled powder spreading process map for metal additive manufacturing (Am). Int. Solid Free Form Fabr. Symp. Austin, TX. 1235-1249 (2017).

Nan, W. et al. Jamming during particle spreading in additive manufacturing. Powder Technol. 338, 253-262 (2018).

Mindt, H. W., Megahed, M., Lavery, N. P., Holmes, M. A. & Brown, S. G. R. Powder Bed Layer Characteristics: The Overseen First-Order Process Input. Metall. Mater. Trans. A 47, 3811-3822 (2016).

Mindt, H. W., Desmaison, O., Megahed, M., Peralta, A. & Neumann, J. Modeling of Powder Bed Manufacturing Defects. J. Mater. Eng. Perform. 27, 32-43 (2018).

Zhao, C. et al. Real-time monitoring of laser powder bed fusion process using high-speed X-ray imaging and diffraction. Sci. Rep. 7, 3602 (2017).

Guo, Q. et al. Transient dynamics of powder spattering in laser powder bed fusion additive manufacturing process revealed by in-situ high-speed high-energy x-ray imaging. Acta Mater. 151, 169-180 (2018).

Lun, C. et al. In situ X-ray imaging of defect and molten pool dynamics in laser additive manufacturing. Nat. Commun. 9, 1-9 (2018).

Calta, N. P. et al. An instrument for in situ time-resolved X-ray imaging and diffraction of laser powder bed fusion additive manufacturing processes. Rev. Sci. Instrum. 89, 55101 (2018).

Parab, N. D. et al. Ultrafast X-ray imaging of laser-metal additive manufacturing processes research papers. J. Synchrotron Radiat. 25, 1467-1477 (2018).

Rasband, W. ImageJ. U. S. Natl. Institutes Heal. Bethesda, Maryland, USA //imagej.nih.gov/ij/ (2012).

\* cited by examiner

POWDER SPREADER

BACKGROUND

For many applications, it is desirable to control the distribution of powder for a variety of manufacturing processes. For instance, a spreader or re-coater, which may include a blade or rod, is used to spread powder over a substrate in powder bed-based additive manufacturing processes, such as laser powder bed fusion, electron beam powder bed fusion, and binder jetting. Such applications may utilize stainless steel, hard polymers, and/or a flexible heat resistant polymer, to maintain a reasonably homogeneous shape and resist heat during the spreading process.

While useful, such spreaders or re-coaters may exhibit issues relating to attaining desirable powder spreading. For instance, regions or zones of powder may be formed with uneven amounts of powder, irregular surfaces, and/or powderless zones. These issues may result in low part quality and undesirable variances, or may otherwise limit manufacturing speed.

These and other matters have presented challenges to powder spreaders and/or re-coaters, for a variety of applications.

SUMMARY

Various example embodiments are directed to powder spreaders, their application and their manufacture. Such embodiments may be useful for additive manufacturing processes, as may be implemented for providing a desirable powder surface at high manufacturing speeds.

As may be implemented in accordance with one or more embodiments, a powder spreader apparatus has a flexible core, a shell on a surface of the core, and a holder. The shell may have a coefficient of friction that is less than a coefficient of friction of the surface of the core. The older is engaged with a first portion of a surface of the shell and being configured to hold the shell and flexible core in place with a second portion of the surface of the shell being exposed.

As may be implemented in accordance with certain embodiments, an apparatus for additive manufacturing includes a powder bed having sidewalls configured to contain powder for additive manufacturing, a spreader and an energy source. The spreader includes a flexible core, a shell on a surface of the core and a holder engaged with a first portion of a surface of the shell and being configured to hold the shell and flexible core in place with a second portion of the surface of the shell being exposed for engaging with the powder. The shell has a coefficient of friction that is less than a coefficient of friction of the surface of the core, the core and shell having a length extending perpendicularly between the sidewalls of the powder bed. The holder is configured with the shell, the core and the sidewalls to contain the powder within the powder bed and to provide a uniform layer of the powder having a planer upper surface by displacing the powder as the spreader advances across the powder bed. The energy source is configured to form a structure by heating portions of the uniform layer.

The above embodiments may be implemented in the context of one or more methods of making and/or using the apparatuses as disclosed. In a particular embodiment, a method is carried out as follows. A shell is engaged with powder in a powder bed, with the shell located on a surface of a flexible core. The shell may have a coefficient of friction that is less than a coefficient of friction of the surface of the core. The powder is displaced to form a uniform layer of the powder having a planer upper surface, by engaging the shell with the powder and advancing the core across the powder bed.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIGS. 2A-2D show an apparatus for powder bed additive manufacturing as may be implemented in accordance with one or more embodiments, in which:

FIG. 2A shows a first isometric view of the apparatus and including a laser;

FIG. 2B shows a second isometric view of the apparatus including a laser;

FIG. 2C shows a side view of the apparatus; and

FIG. 2D shows an enlarged view including a powder spreader apparatus;

FIGS. 3A-3B show an apparatus for powder bed additive manufacturing as may be implemented in accordance with one or more embodiments, in which:

FIG. 3A shows a side view of the apparatus; and

FIG. 3B shows an enlarged view including a powder spreader apparatus; and

Figure 1A:
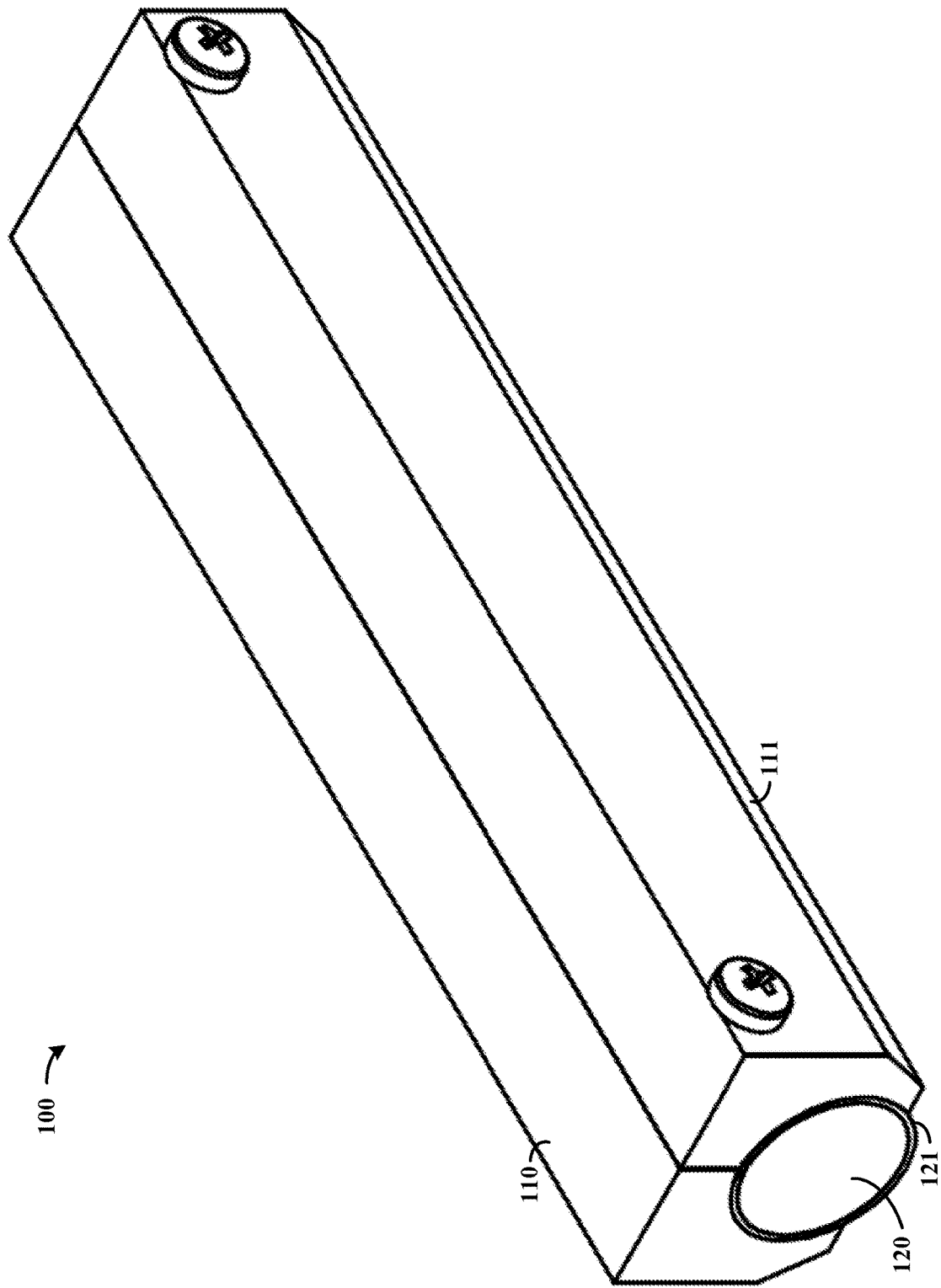
FIG. 1A shows a powder spreader apparatus, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving powder spreaders or re-coaters. In certain implementations, aspects of the present disclosure have been shown to be beneficial when used in the context of powder-bed additive manufacturing processes, such as laser powder bed fusion, electron beam powder bed fusion, binder jetting) to spread powder over a substrate. While not necessarily so limited, various aspects may be appreciated through a discussion of examples using such exemplary contexts.

According to various example embodiments, a powder spreader employs a powder interface component such as a roller or blade that exhibits a very low friction coefficient.

For instance, a 99.5% graphite surface may exhibit a friction coefficient of less than 0.15, for example on the order of ~0.1. Certain embodiments utilize other graphite surfaces, for instance such as a 95% graphite surface or a 100% graphite surface (e.g., with nominal impurities). In connection with these and other embodiments herein, it has been recognized/discovered that the use of a material having such a low friction coefficient in connection with powder bed spreaders results in reduced/minimal dragging forces on the powder. It has further been recognized/discovered that utilizing such a material that also exhibits high electrical conductivity can mitigate the accumulation of static electrical charges, which in turn mitigates instabilities in the powder and/or movement thereof. Utilization of such approaches may facilitate high-speed powder spreading while avoiding negative effects such as those characterized above with respect to the distribution/spreading of powder, quality of resulting products, and limitations in manufacturing speed.

In a particular application, a powder spreader includes a flexible core, such as a polymeric material (e.g., silicone rubber) core exhibiting a hardness of 80 D (using the Short D durometer hardness scale), and a graphite foil, the latter of which may have a thickness of about 1 mm. This hardness is sufficient to keep the morphology of the spreader as it pushes powder into a substrate, and flexible enough to deform elastically during interaction with layer imperfections. The graphite foil is flexible as well, and may follow elastic deformation of the core. The graphite foil may be capable of withstanding a maximum of 870° C., while the silicone rubber is able to withstand temperatures within the range of −60° C. to 260° C. Accordingly, both materials are capable of withstanding the temperatures during the spreading process. Other materials may also be used to achieve similar properties, to suit particular applications.

Certain embodiments are directed to a powder spreader apparatus having a flexible core, a shell on a surface of the core, and a holder engaged with the core, for instance as may be implemented for engaging the shell with powder as characterized herein. For example, the holder may be engaged with a first portion of a surface of the shell, and configured to hold both the shell and flexible core in place with a second portion of the surface of the shell being exposed. The shell may have a coefficient of friction that is less than a coefficient of friction of the surface of the core, which may facilitate interaction with powder.

The shell may be implemented in a variety of manners. In some instances, the shell operates with the core and the holder to displace, upon interaction of the second portion of the surface of the shell with powder in a powder bed, the powder to form a uniform layer of the powder having a planer upper surface. This may be carried out as the core is advanced across the powder bed. The shell may be electrically conductive and configured to conduct static electrical charge away from powder engaged therewith. Further, the shell may be deposited on the surface of the core or otherwise attached thereto.

In some implementations, the core is a roller having a cylindrical shape defined by a cylindrical surface and the shell has a cylindrical shape that covers the cylindrical surface. The holder has an inner cylindrical surface that is engaged with an outer cylindrical surface of the shell. The shell and core may be configured to rotate within the holder.

As may be implemented in accordance with one or more embodiments, an additive manufacturing apparatus includes a powder bed, a spreader and an energy source. The spreader may include a flexible core, a shell on a surface of the core and a holder engaged with the shell to hold the shell and flexible core in place with a portion of the surface of the shell being exposed for engaging with powder in the powder bed. The core and shell may have a length extending perpendicularly between the sidewalls of the powder bed. The holder may operate with the shell, the core and the sidewalls to contain the powder within the powder bed and to provide a uniform layer of the powder having a planer upper surface by displacing the powder as the spreader advances across the powder bed. A mechanical component may be coupled to the spreader and configured to move the spreader in a fixed direction in parallel with the sidewalls, for example to facilitate the aforementioned advancement. The energy source may form structures by heating portions of the uniform layer and, if applicable, heating portions of further uniform layers provided thereon.

The shell may be formed and implemented in a variety of manners. In some embodiments, the shell may have a coefficient of friction that is less than a coefficient of friction of the surface of the core (e.g., less than 0.15). The shell may be electrically conductive and configured to conduct static electrical charge away from powder engaged with the shell. The shell may be formed of one or more of a variety of materials, for instance with a surface that is 99.5% graphite with a friction coefficient of 0.1. The shell may be deposited on the surface of the core, or formed separately and attached to the core.

The core may also be formed and implemented in a variety of manners. The core may be a roller having a cylindrical shape defined by a cylindrical surface, in which instance shell also has a cylindrical shape that covers the cylindrical surface. The core may have a knife shape with blade end covered by the shell such that the shell interacts with the powder to provide a uniform layer as noted herein. The core may include a polymeric material or other material that deforms, for example by allowing the shell to deform while forming a uniform powder layer.

Various embodiments as noted herein may be implemented in the context of one or more methods of making and/or using the apparatuses as disclosed. In a particular embodiment, a uniform powder surface is formed as follows. A shell is engaged with powder in a powder bed, with the shell located on a surface of a flexible core. The shell may have a coefficient of friction that is less than a coefficient of friction of the surface of the core. The powder is displaced to form a uniform layer of the powder having a planer upper surface, by engaging the shell with the powder and advancing the core across the powder bed.

The powder may be displaced in a variety of manners. In some embodiments, a powder bed having sidewalls is utilize to contain the powder. The sidewalls are separated by a width that may correspond to a length of the shell and the flexible core that extends perpendicular to the sidewalls. For instance, the length of the shell and flexible core may be slightly less than the width by which the sidewalls are separated, to facilitate the forming of the uniform layer with the shell and flexible core extending between the sidewalls. The shell and flexible core may be longer than the width of the sidewalls and used to extend over the sidewalls for forming the uniform layer at a level corresponding to a top edge of the sidewalls. In these and other embodiments, the core may be used to apply pressure to the powder via the shell while deforming a portion of the core applying the pressure. Further, the core and shell may be used to displace the powder in a lateral direction along a surface of the powder (e.g., perpendicular to movement of the core and shell).

The shell and the core may be held with a mechanical holder having an inner surface conformed to an outer surface of the shell. This inner surface may allow the shell to rotate within the holder with a portion of the outer surface of the shell exposed and engaged with the powder.

In some implementations, the method involves forming a structure from the powder by heating portions of the uniform layer and, thereafter, adding powder on an upper surface of the uniform layer. The steps of engaging the shell and displacing the powder are repeated with the added powder to form a further uniform layer. Portions of this further uniform layer may be heated to form additional portions of the structure.

Figure 1B:
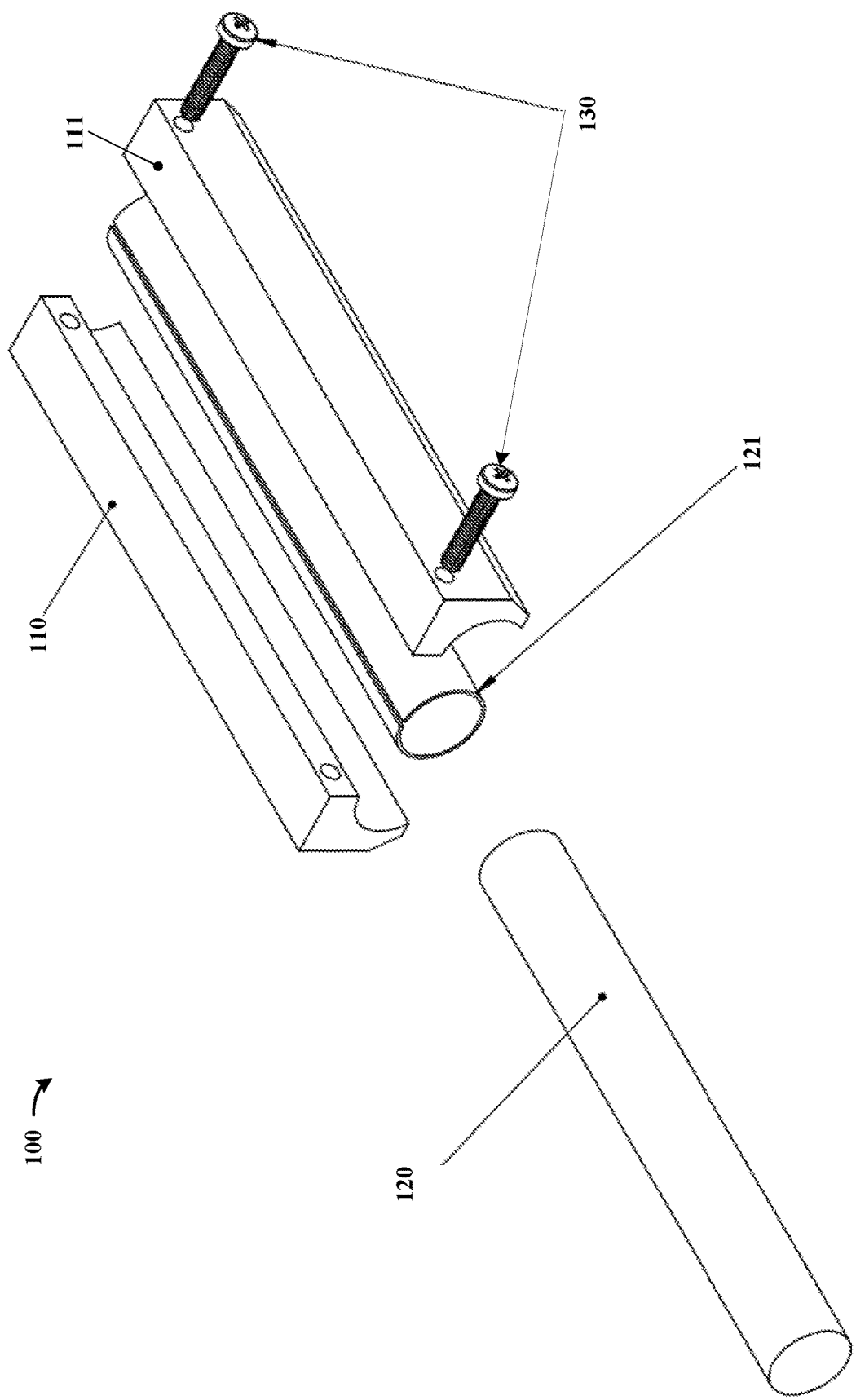
FIG. 1B shows the powder spreader apparatus of FIG. 1A, in exploded form.

Turning now to the figures, FIG. 1A and FIG. 1B respectively show assembled and exploded views of a powder spreader apparatus 100, as may be implemented in accordance with various embodiments. The powder spreader 100 includes opposing spreader holding components 110 and 111, spreader core 120 and shell 121. Bolts 130 operate to fasten the spreader holding components together for enclosing the shell 121 and accepting the spreader core 120 within.

The core 120 may include a flexible material such as a silicone rubber or other polymeric material. The shell 121 may include a foil having a low coefficient of friction, such as a graphite foil with a thickness set to facilitate deformation of the foil with the core 120. For instance, the shell may include a surface region having 99.5% graphite material, which may be about 1 mm in thickness. The holding components 110 and 111 may be made of a suitable material, such as stainless steel. In some implementations, the shell 121 is coated onto the core 120.

Figure 2A:
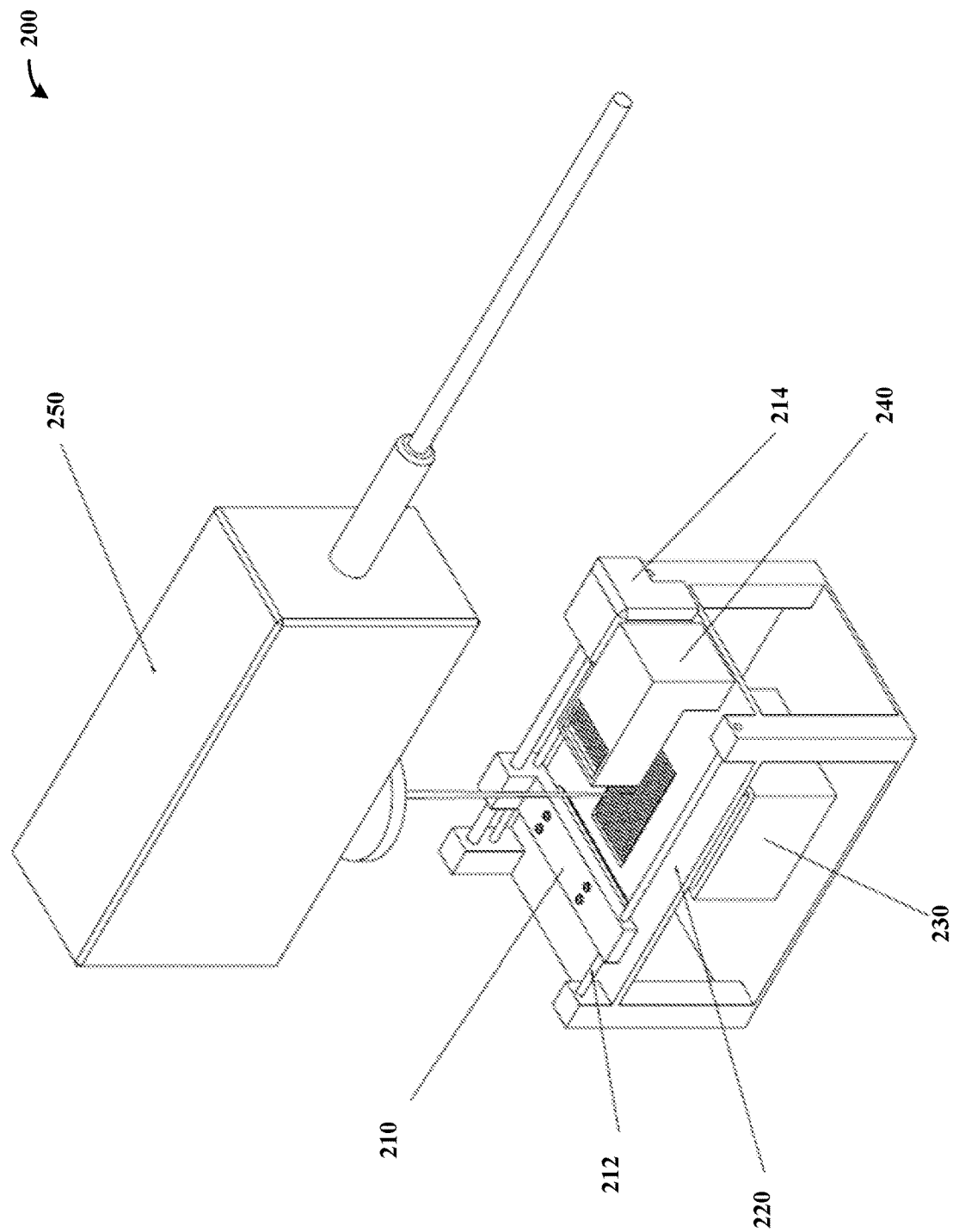
Figure 2B:
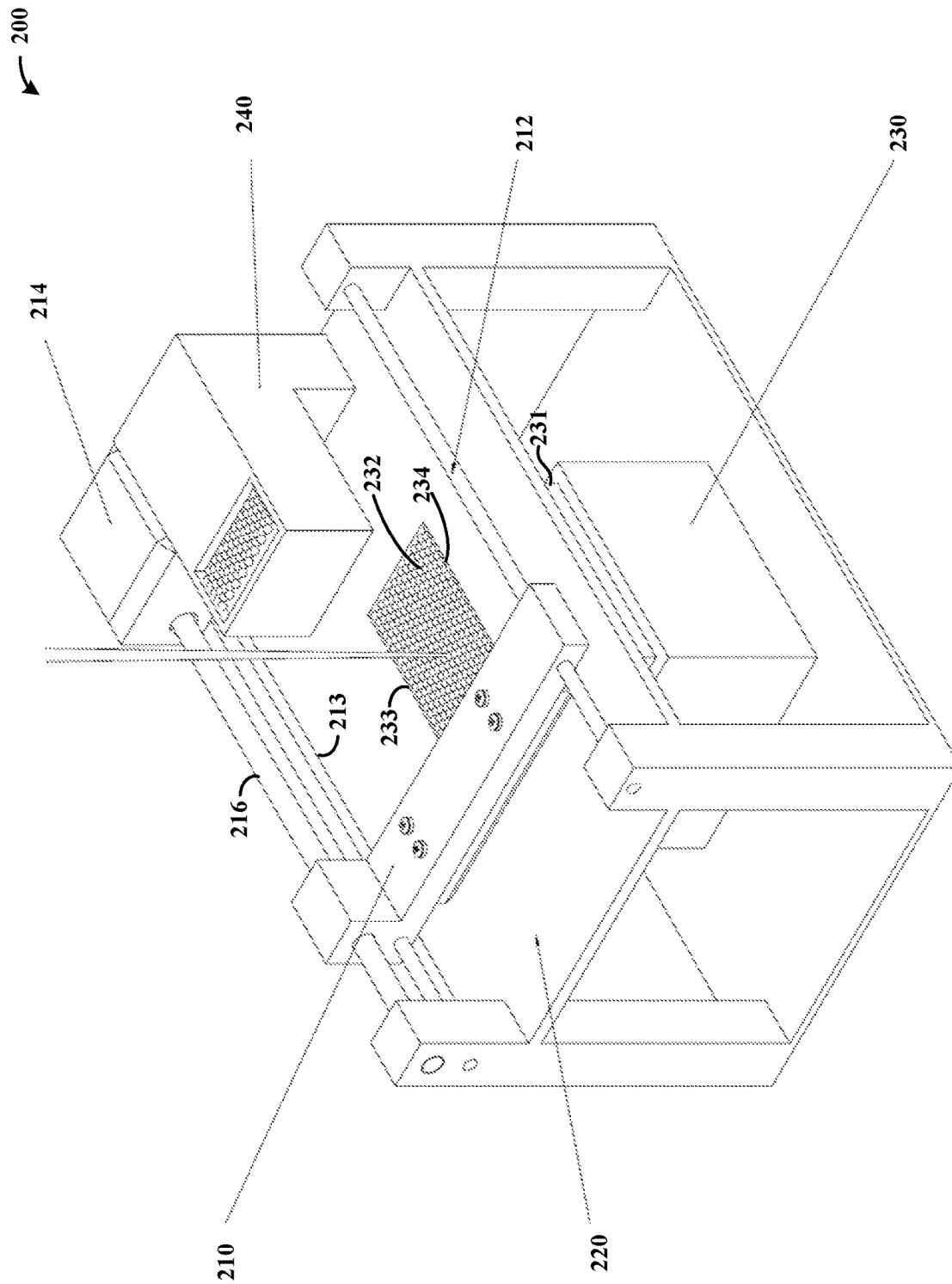
Figure 2C:
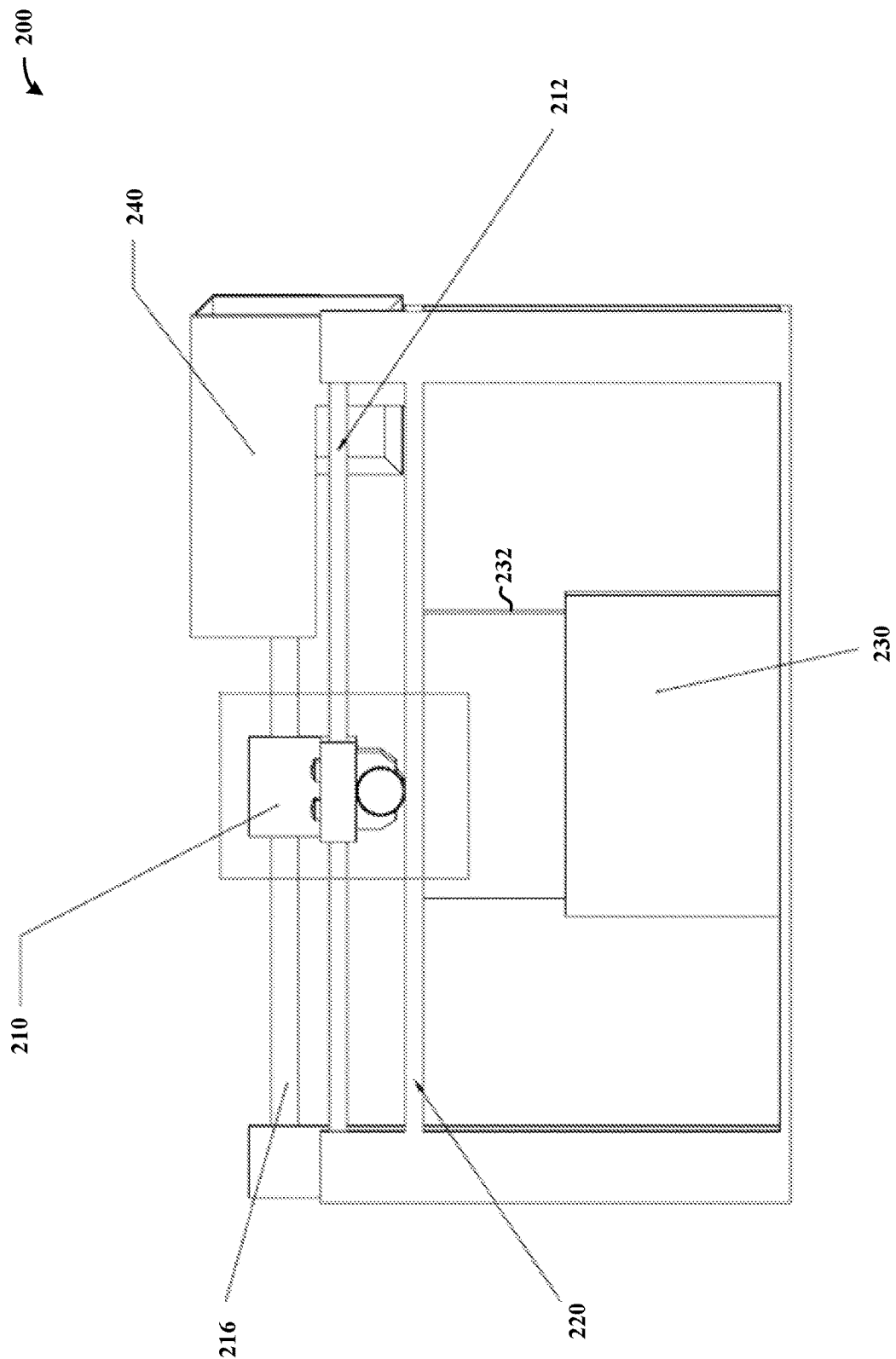
Figure 2D:
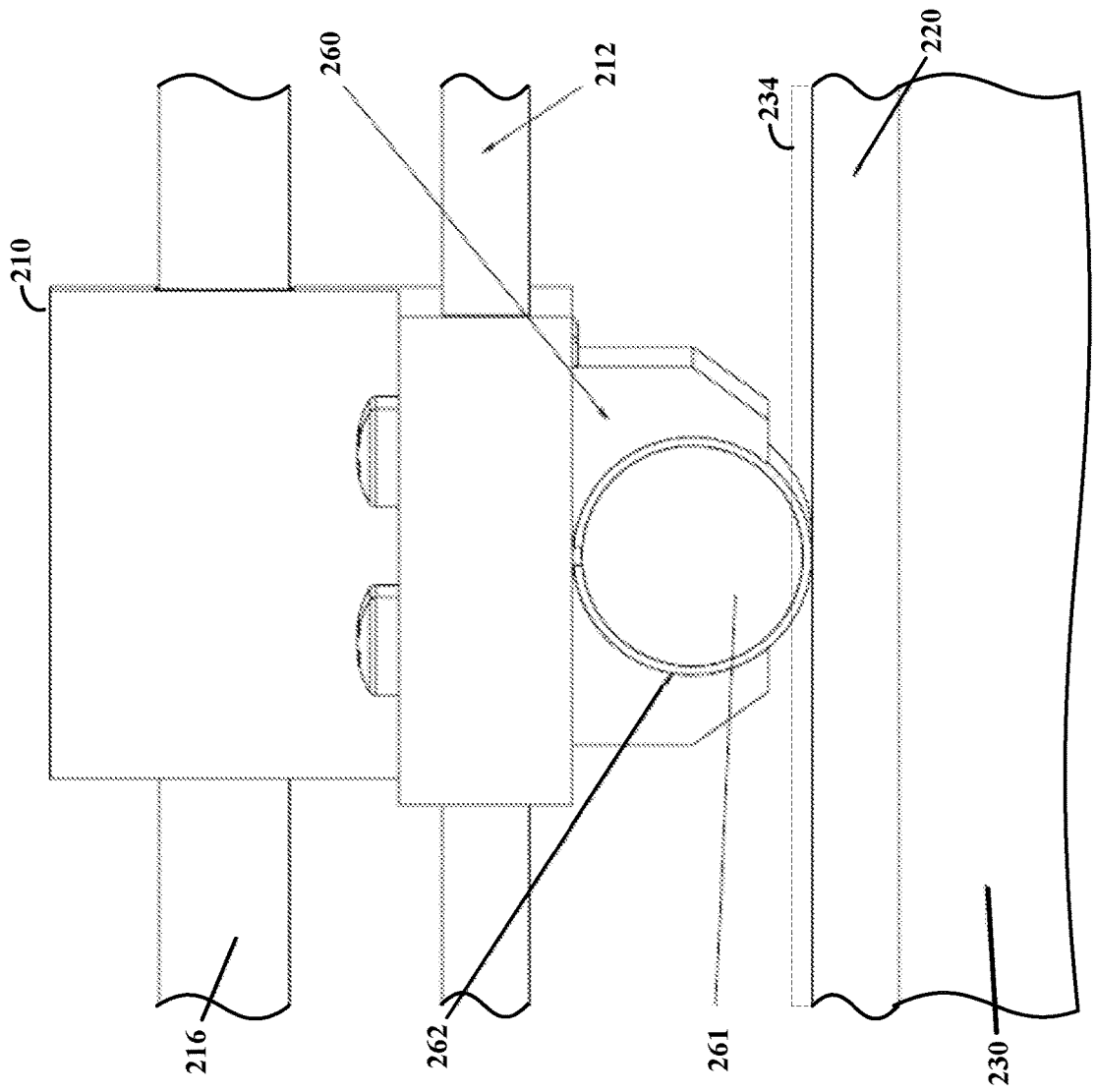

FIGS. 2A-2D show an apparatus 200 for powder bed additive manufacturing as may be implemented in accordance with one or more embodiments. Referring to FIGS. 2A and 2B, front and rear isometric views are respectively shown of the apparatus 200 with a laser system 250 that may form part of the apparatus 200. FIGS. 2C and 2D depict example side views. The apparatus 200 includes a powder spreader 210, spreader guide rails 212 and 213, and a spreader motion mechanism 214/216. The powder spreader 210 includes opposing spreader holding components 260, a spreader core 261 and shell 262, as may be implemented in a manner similar to core and shell 120/121 of FIG. 1A.

The apparatus 200 may also include a building platform 220 and a substrate vertical motion stage 230 operable for raising and lowering a substrate 231 upon which powder 232 is delivered via powder delivery system 240.

The powder spreader 210, guide rails 212 and 213, and motion mechanism 214/216 (e.g., with 216 being a threaded or other drive) may operate together to facilitate the formation of a uniform powder surface on the substrate 231. In certain implementations, the powder spreader 210 may be implemented using the powder spreader apparatus depicted in FIGS. 1A and 1B.

In operation, the laser system 250 may be utilized to form a structure in powder 232 as follows. The powder delivery system 240 may deliver powder 232 onto the substrate 231, and the powder spreader 210 may be utilized to spread the powder 232 to form a uniform surface thereon. Laser 250 may be used to heat the powder and form structures therein. Additional such iterations may be provided, for instance by lowering the substrate 231 via the vertical motion stage 230, addition of further powder supplied by the powder delivery system 240, utilization of the powder spreader 210 to form another uniform surface with the additional powder followed by the formation of additional structures therefrom using the laser system 250.

The powder spreader 210 may be aligned perpendicularly to the powder bed substrate 232, within sidewalls that contain powder relative to the spreader. Referring to FIG. 2B, sidewalls 233 and 234 may facilitate containment of the powder 232. For instance, sidewalls may be within the building platform 220, and may include a portion extending above such a platform as depicted by way of example in FIG. 2D (with sidewall 234 extending above the surface of the building platform). The sidewalls may be made of high-purity glassy carbon. The substrate may be made of a suitable material, such as aluminum Al6061. The spreader may be adapted to spread powder over a workpiece as layers in the workpiece are formed.

Figure 3A:
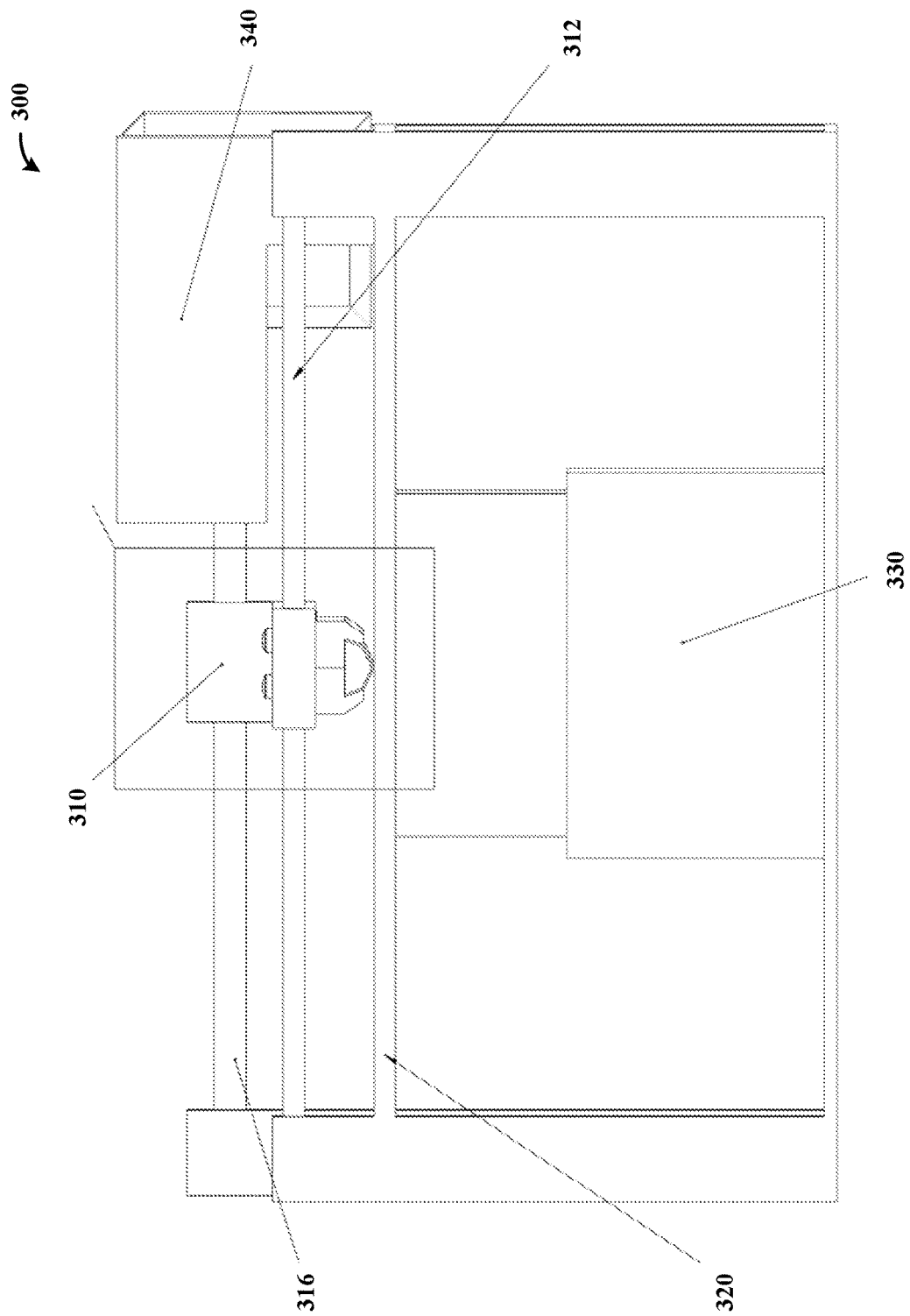
Figure 3B:
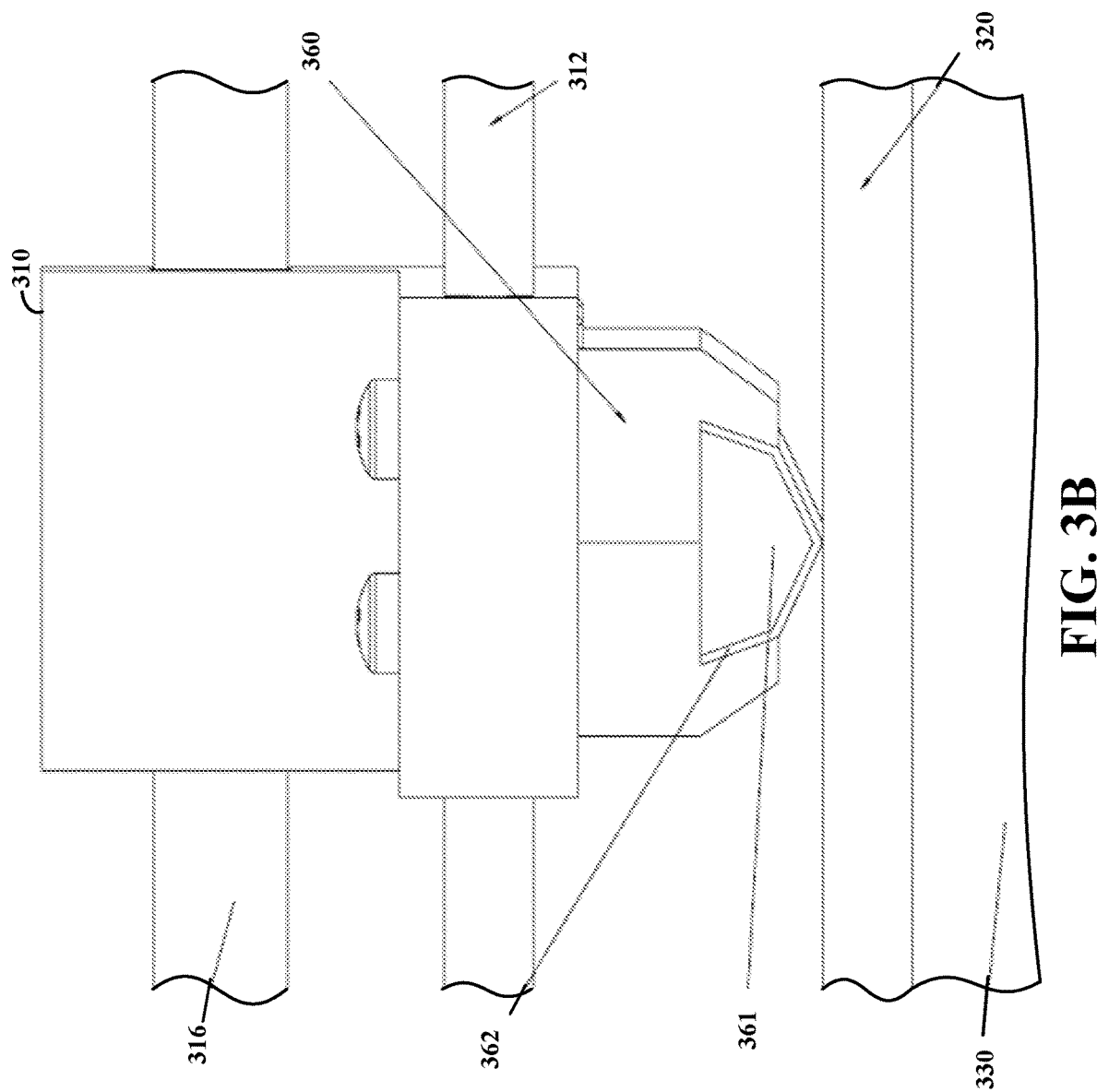

FIGS. 3A-3B show an apparatus 300 for powder bed additive manufacturing, with a knife-type spreader, as may be implemented in accordance with one or more embodiments, with FIG. 3A depicting a side view of the apparatus FIG. 3B sowing an enlarged view including a powder spreader apparatus. FIGS. 3A and 3B may be implemented, for example, in a manner similar to that depicted in FIGS. 2C and 2D, and in connection with a laser apparatus as depicted in FIG. 2A.

The apparatus 300 includes a powder spreader 310, a spreader guide rail 312 and a spreader motion mechanism component 316, for example as may be coupled to a motion mechanism such as motion mechanism 214 depicted in FIG. 2A. The powder spreader 310 includes opposing spreader holding components 360, a spreader core 361 and shell 362, as may be implemented in a manner similar to core and shell 420/421 of FIG. 4A. The apparatus 300 may also include a building platform 320 and a substrate vertical motion stage 330 operable for raising and lowering a substrate (e.g., as in 231) upon which powder is delivered via powder delivery system 340. The powder spreader 310, guide rail 312 and motion mechanism may operate together to facilitate the formation of a uniform powder surface on the substrate.

Figure 4A:
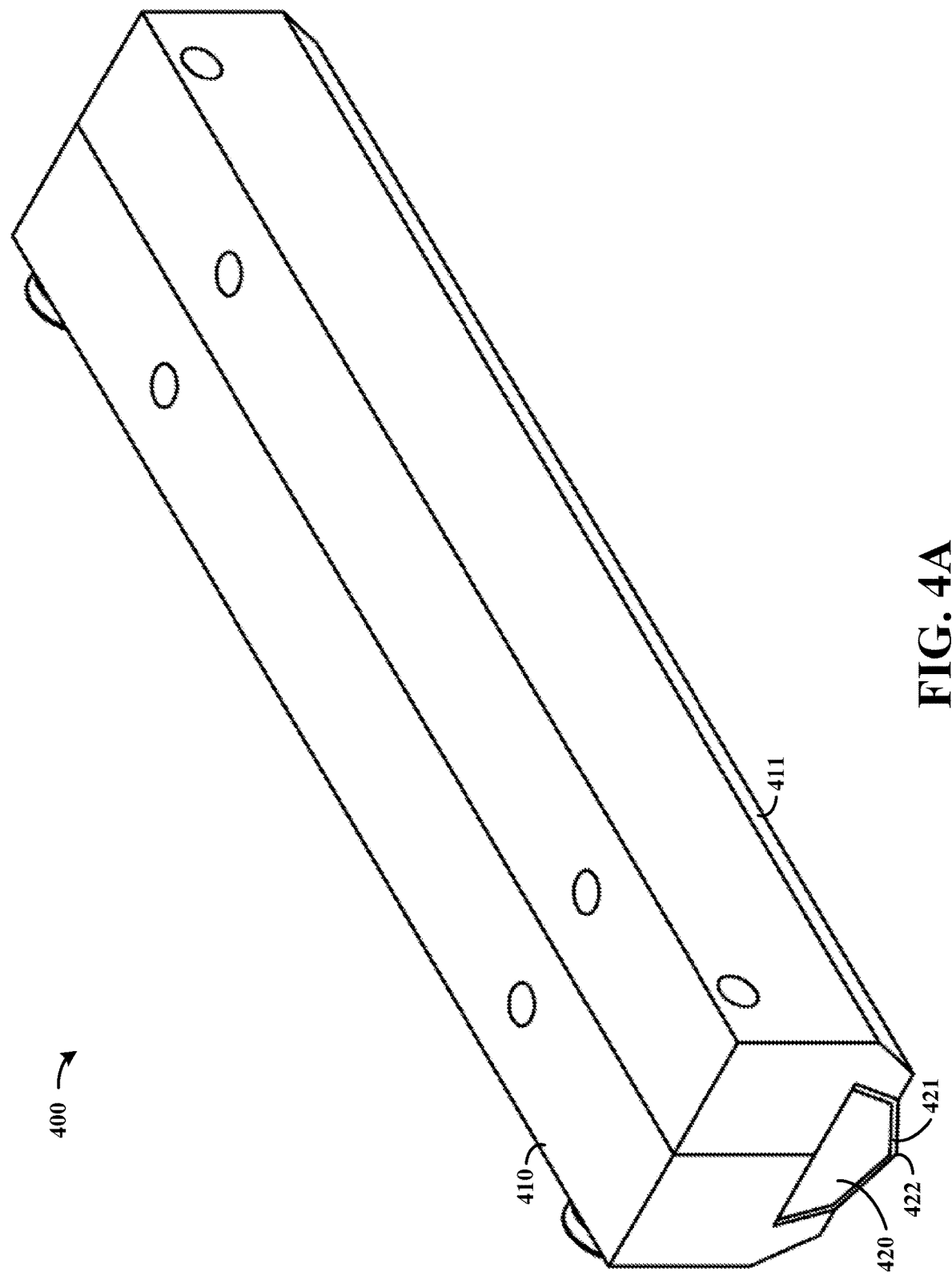
FIG. 4A shows a powder spreader apparatus, in accordance with one or more embodiments.
Figure 4B:
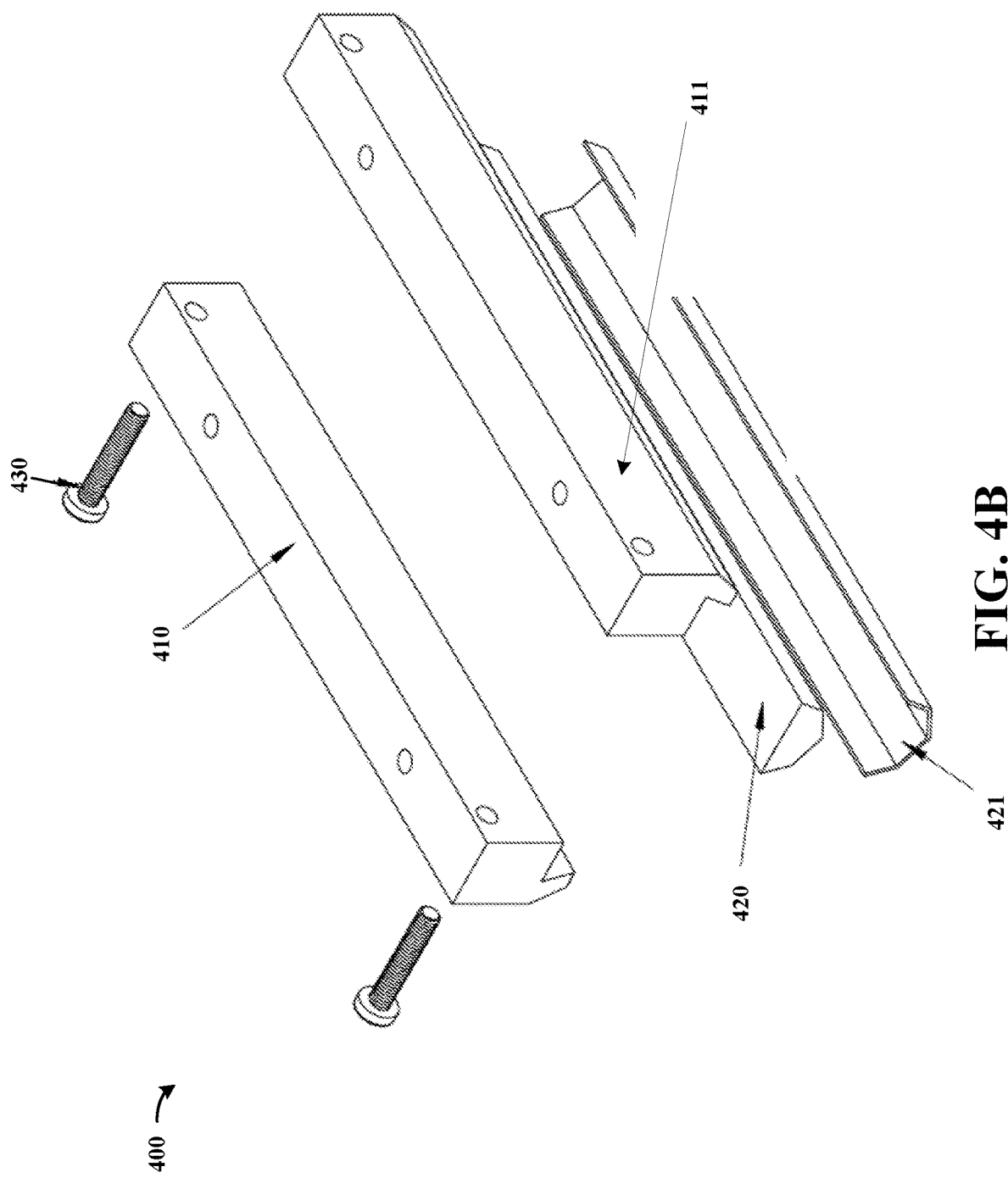
FIG. 4B shows the powder spreader apparatus of FIG. 4A, in exploded form.

Referring to FIGS. 4A and 4B, a powder spreader apparatus 400 is respectively shown assembled and in exploded form. The apparatus 400 may be implemented, for example, as the powder spreader 310 in FIGS. 3A-3B. The powder spreader apparatus 400 includes opposing spreader holding components 410 and 411, as well as a spreader core 420 and shell 421 that include a knife-type shape coming to a point 422 at an underside thereof. Bolts 430 operate to fasten the spreader holding components together for enclosing the shell 421 and accepting the spreader core 420 within.

The core 420 may include a flexible material such as a silicone rubber or other polymeric material. The shell 421 may include a foil having a low coefficient of friction, such as a graphite foil with a thickness set to facilitate deformation of the foil with the core 420. As similar to the example discussed with FIGS. 1A and 1B, the shell 421 may include a surface region having 99.5% graphite material, which may be about 1 mm in thickness. The holding components 410 and 411 may be made of a suitable material, such as stainless steel. In some implementations, the shell 421 is coated onto the core 420.

Based upon the above discussion and illustrations, those skilled in the art will readily recognize that various modifications and changes may be made to the various embodiments without strictly following the exemplary embodiments and applications illustrated and described herein. For example, various shapes may be implemented for the roller cores shown and described herein, and alternative shapes such as knife-edge type shapes may be utilized. Such modifications do not depart from the true spirit and scope of various aspects of the invention, including aspects set forth in the claims.

What is claimed is:

1. An apparatus for additive manufacturing, the apparatus comprising:
a powder bed having sidewalls and being configured to contain powder for additive manufacturing;
a spreader including:
a flexible core including a polymeric material;
a shell on a surface of the core, the core and shell having a length extending perpendicularly between the sidewalls of the powder bed; and
a holder engaged with a first portion of a surface of the shell and being configured to hold the shell and core in place with a second portion of the surface of the shell being exposed for engaging with the powder, the holder being configured with the shell, the core and the sidewalls to:
contain the powder within the powder bed; and
provide a uniform layer of the powder having a planer upper surface by displacing the powder as the spreader advances across the powder bed; and
an energy source configured to form a structure by heating portions of the uniform layer.

2. The apparatus of claim 1, wherein the shell has a coefficient of friction that is less than 0.15.

3. The apparatus of claim 1, wherein the shell is electrically conductive and configured to conduct static electrical charge away from powder engaged therewith.

4. The apparatus of claim 1, wherein the shell has a surface that is 99.5% graphite with a friction coefficient of 0.1.

5. The apparatus of claim 1, wherein the core is a roller having a cylindrical shape defined by a cylindrical surface, and the shell has a cylindrical shape that covers the cylindrical surface.

6. The apparatus of claim 1, wherein the core has a knife shape with a blade end covered by the shell and configured to interact the shell with the powder to provide the uniform layer.

7. The apparatus of claim 1, wherein:
the powder has layer imperfections,
the shell is layer deposited on a surface of the core, and
the core is configured to deform elastically during interaction with the layer imperfections in the powder.

8. The apparatus of claim 1, further including a mechanical component coupled to the spreader and configured to move the spreader in a fixed direction in parallel with the sidewalls.

9. A powder spreader apparatus including:
a flexible core including a polymeric material;
a shell on a surface of the core; and
a holder engaged with a first portion of a surface of the shell and being configured to hold the shell and core in place with a second portion of the surface of the shell being exposed.

10. The apparatus of claim 9, wherein the shell is configured and arranged with the core and the holder to, upon interaction of the second portion of the surface of the shell with powder in a powder bed, displace the powder to form a uniform layer of the powder having a planer upper surface, as the core is advanced across the powder bed.

11. A powder spreader apparatus comprising:
a flexible core including a polymeric material;
a shell on a surface of the core, the shell being electrically conductive and configured to conduct static electrical charge away from powder engaged therewith; and
a holder engaged with a first portion of a surface of the shell and being configured to hold the shell and core in place with a second portion of the surface of the shell being exposed.

12. The apparatus of claim 9, wherein:
the core is a roller having a cylindrical shape defined by a cylindrical surface;
the shell has a cylindrical shape that covers the cylindrical surface; and
the holder has an inner cylindrical surface that is engaged with an outer cylindrical surface of the shell, the shell and core being configured to rotate within the holder.

13. The apparatus of claim 9, wherein the shell is layer deposited on a surface of the core.

* * * * *